United States Patent
Heck et al.

[11] Patent Number: 5,198,257
[45] Date of Patent: Mar. 30, 1993

[54] CUTTING COEXTRUDED THERMOPLASTIC FOOD PRODUCTS

[75] Inventors: Ernst Heck, Vufflens-la-Ville; Jean Horisberger, Ecublens, both of Switzerland

[73] Assignee: Nestec S.A., Vevey, Switzerland

[21] Appl. No.: 787,937

[22] Filed: Nov. 5, 1991

[30] Foreign Application Priority Data

Nov. 26, 1990 [EP] European Pat. Off. ...... 90122501.1

[51] Int. Cl.5 ................ A21C 5/00; A23P 1/00
[52] U.S. Cl. .................... 426/282; 99/450.6; 99/450.7; 425/133.1; 425/310; 426/283; 426/503; 426/512
[58] Field of Search ........... 426/282, 283, 284, 503, 426/512; 99/450.6, 450.7; 425/131.1, 133.1, 232, 310, 314, 362

[56] References Cited

U.S. PATENT DOCUMENTS

| | | | |
|---|---|---|---|
| 1,978,163 | 10/1934 | Megow | 425/133.1 |
| 3,142,266 | 7/1964 | Caferro | 425/131.1 |
| 3,480,445 | 11/1969 | Slaybaugh | 426/284 |
| 4,543,769 | 10/1985 | Schmitz | 426/284 |
| 4,889,669 | 12/1989 | Suzuki | 425/133.1 |
| 5,035,905 | 7/1991 | Knebl | 426/284 |

FOREIGN PATENT DOCUMENTS

0178878A2  4/1986  European Pat. Off. .
0251630    1/1988  European Pat. Off. .
1538722    1/1979  United Kingdom .

Primary Examiner—George Yeung
Attorney, Agent, or Firm—Vogt & O'Donnell

[57] ABSTRACT

Extrusion cooked coextruded food products having a cereal-based outer envelope in a thermoplastic state are cut by passing the product between two parallel counter-rotating cylinder surfaces which define male and female impression elements configured and positioned so that upon rotation, the impression elements of one surface converge with the elements of the other surface in a male to female relation for cutting the product into discrete pieces.

8 Claims, 3 Drawing Sheets

CUTTING COEXTRUDED THERMOPLASTIC FOOD PRODUCTS

BACKGROUND OF THE INVENTION

This invention relates to a process and an apparatus for the production of food products by coextrusion cooking.

More particularly, the present invention relates to the production of food products by coextrusion cooking in which one or more cooked coextruded strands(s) is/are subsequently cut up to give products of predetermined shape.

U.S. Pat. No. 3,480,445, for example, relates to a process and an apparatus for the production of a coextruded product in which an outer envelope based on cereals is extruded under pressure with a small addition of water. During this operation, the water is evaporated and the envelope is cooked, and after the envelope has emerged from the extrusion die when it is back at atmospheric pressure, the cooked product expands radially. At the same time, a filling inside the cereal envelope, for example consisting of dairy products or fruits, is coextruded.

The end product obtained is finally cooled and then cut into pieces.

European Patent Application Publication No. 178 878, for example, relates to an apparatus for cutting a strand consisting of an outer envelope of dough and an inner filling.

According to this document, a conveyor belt transports the strand, at least one cutter being arranged above the conveyor belt. The cutter makes an alternating up-and-down movement combined with a longitudinal movement in the direction of advance of the product to be cut.

On the one hand, however, this document does not relate to a cooked product and, on the other hand, only enables a strand to be cut perpendicularly to its axis.

Now, coextruded cooked products cannot be compared with products obtained by simple coextrusion which then have to be cooked to give a finished food product.

This is because uncooked products are highly deformable. Thus, the compression of the filling by which cutting is inevitably accompanied merely causes stretching of the outer envelope which enables the compressed filling to assume the necessary position.

By contrast, products obtained by coextrusion cooking are cooked and lead directly after cutting to a finished product.

Thus, the plastic character of the product obtained after coextrusion cooking is very limited, and compression of the filling caused by a cutter cannot be totally compensated for by stretching of the envelope, which can only be minimal.

In addition, the prior art does not enable products of any shape to be obtained from a coextruded strand, the cross-section of the coextruded strand being constant in shape.

Accordingly, the object of the present invention is to solve these problems.

SUMMARY OF THE INVENTION

The present invention provides a process for the production of a coextruded cooked food product by coextrusion cooking of an outer envelope based on cereals and an inner lining of an edible filling of any type in which, after this operation and while the outer envelope is still thermoplastic, the product is cut by stamping between two parallel counter-rotating cylindrical surfaces which define male and female impression elements configured and positioned so that upon rotation, the impression elements of one surface converge with the elements of the other surface in a male to female relation to cooperate to cause shearing to cut the product into pieces.

Because it is stamped while still in the thermoplastic state, the coextruded cooked product can be cut into any shape while ensuring perfect joining of the edges of the envelope in the zones where the cutting tool formed by the two impression elements and their edge line pass through the filling.

DETAILED DESCRIPTION OF THE INVENTION

The process according to the invention essentially comprises forming a strand of constant cross-section over its entire length by coextrusion cooking by a known process such as described, for example, in U.S. Pat. No. 3,480,445.

While the outer envelope of the strand is still thermoplastic, the strand obtained is then cut by stamping between two impression elements each having an edge line.

The thermoplastic properties last for only a few seconds after the strand has left the coextrusion cooking apparatus. It is this period of time which, coupled with the speed at which the coextruded strand is transported from the coextrusion cooking apparatus to the stamping unit, that determines the positioning of the stamping unit in relation to the coextrusion cooking apparatus.

In one example, the thermoplastic composition of an envelope of a coextruded strand may consist of a mixture of wheat flour, sugar and salt, for example in the following proportions by weight: 89% flour, 10% sugar, 1% salt. 5 to 20% water is then added to the mixture.

It has been found that, under typical coextrusion cooking conditions, namely a pressure of approximately 100 bar and a temperature of the order of 150° C., these water contents constitute a good compromise between expansion and the thermoplastic character.

The filling, which forms the core of the coextruded product, may be made from a mixture of 70% by weight fats, 20% by weight fibers and 10% by weight sugar in cases where it is desired to obtain a product intended as a food for domestic animals, such as dogs or cats.

In this process, the two edge lines of the male and female impression elements, which are situated on two parallel cylindrical surfaces rotatable about their respective axes, cooperate during the stamping operation to cut the coextruded product by shearing at their points of contact.

It may be of advantage with a view to obtaining flat or lenticular products to carry out a flattening operation between the point of exit from the coextrusion die and the cutting station.

Other features and advantages of the invention will become apparent from the following description in conjunction with the accompanying drawings, which are provided solely by way of example.

DETAILED DESCRIPTION OF THE DRAWINGS

Figure 1:
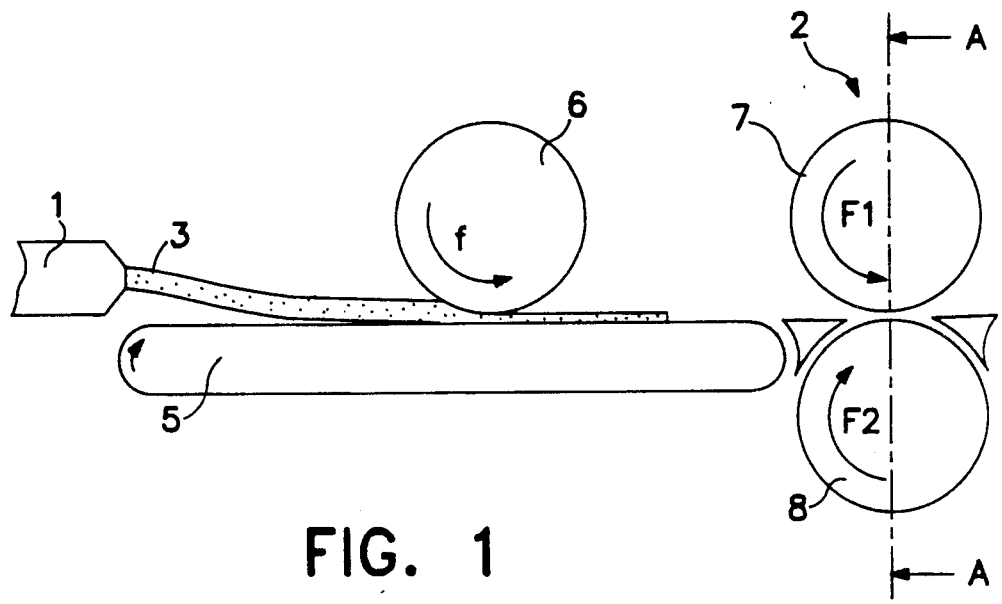
FIG. 1 is a diagrammatic view of an apparatus according to the invention.

The process according to the invention is carried out using an apparatus of the type illustrated in FIG. 1 which comprises a coextrusion cooking apparatus 1, for example of the type described in U.S. Pat. No. 3,480,445, and a cutting unit 2 for a product 3 obtained by the coextrusion cooking apparatus. A flattening unit for the product 3 may be arranged between the coextrusion cooking apparatus 1 and the cutting unit 2. A conveyor belt 5 may be provided to transport the product 3 from the coextrusion cooking apparatus 1 to the cutting unit 2. The conveyor belt 5 may of course be replaced by any other suitable means, for example by a roller conveyor.

The optional flattening unit for the product 3 may be formed by a cylinder 6 which has a horizontal axis and which is rotatable about its axis in the direction of the arrow f perpendicularly to the direction of advance of the conveyor belt 5. The cylinder 6 is separated from the belt 5 by a height less than the thickness of the product 3 formed in the coextrusion cooking apparatus 1 in cases where it is desired to flatten the product.

As further illustrated in FIG. 1, the cutting unit 2 comprises two vertically adjacent cutting cylinders 7 and 8 which have parallel horizontal axes and are perpendicular to the direction of advance of the conveyor belt 5 and which are rotatable about their longitudinal axes, rotating in opposite directions as indicated by the arrows F1 and F2. The product 3, optionally flattened beforehand, is intended to be cut between the two cylinders 7 and 8 in the zone where they contact one another.

Figure 2:
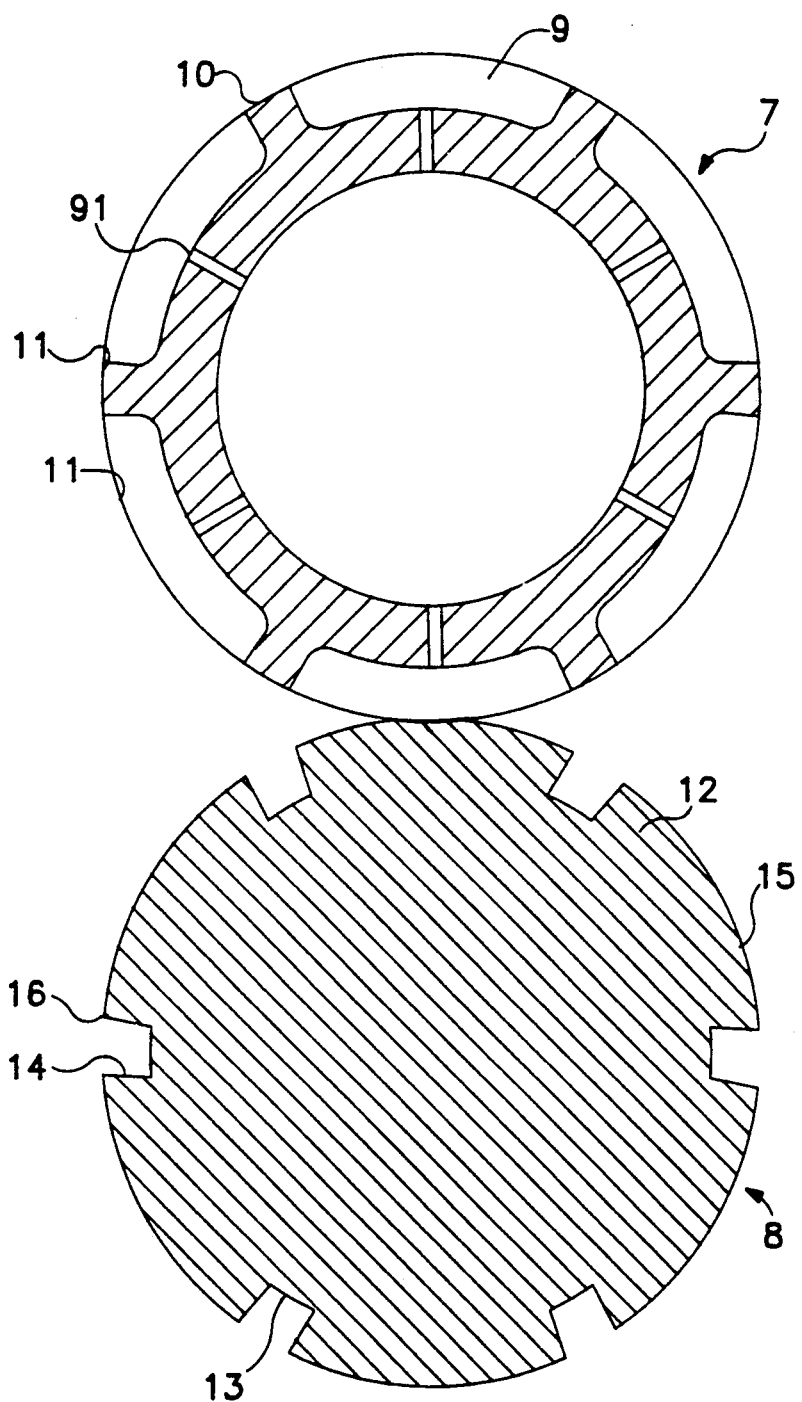
FIG. 2 is a sectional view taken through the cutting cylinders of the apparatus according to the invention taken perpendicularly to their axes.

As can be seen from FIG. 2, the upper cylinder 7 has recessed female impression elements 9 which are distributed at regular intervals over its entire surface and which are spaced radially from one another, being separated by a surface 10 which may be part of a cylinder.

Thus, each female impression element 9 is delimited by an edge line 11 formed by the intersection of the impression elements 9 with the surface 10.

Each female impression element 9 may have one or more orifices 91 in its recessed surface connected to a compressed air source by means which have not been shown.

The lower cylinder 8 has raised male impression elements 12 which are distributed at regular intervals over its outer surface and which are spaced radially from one another, being separated by recessed surfaces 13. Each male impression element 12 has a side 14 which connects the surface 13 surrounding it to a central surface 15 which may be flat or recessed or formed by part of a cylinder.

Thus, each male impression element 12 has an edge line 16 formed by the intersection of its side 14 and its central surface 15.

Figure 3:
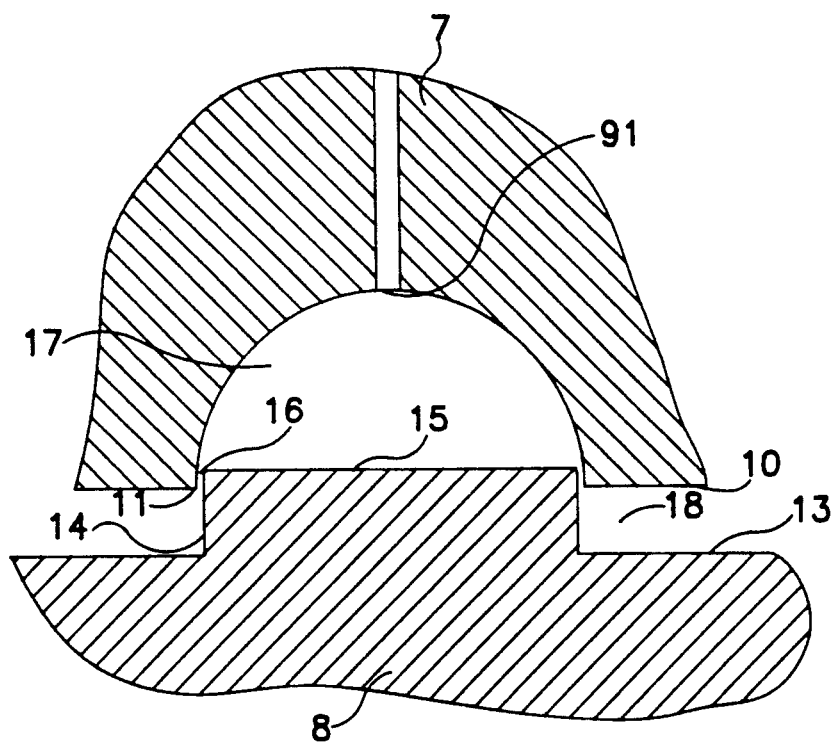
FIG. 3 is a section through a detail along a plane passing through the axes of the cutting cylinders on the line A—A of FIG. 1 illustrating the contacting of a male impression element and a female impression element.
Figure 5:
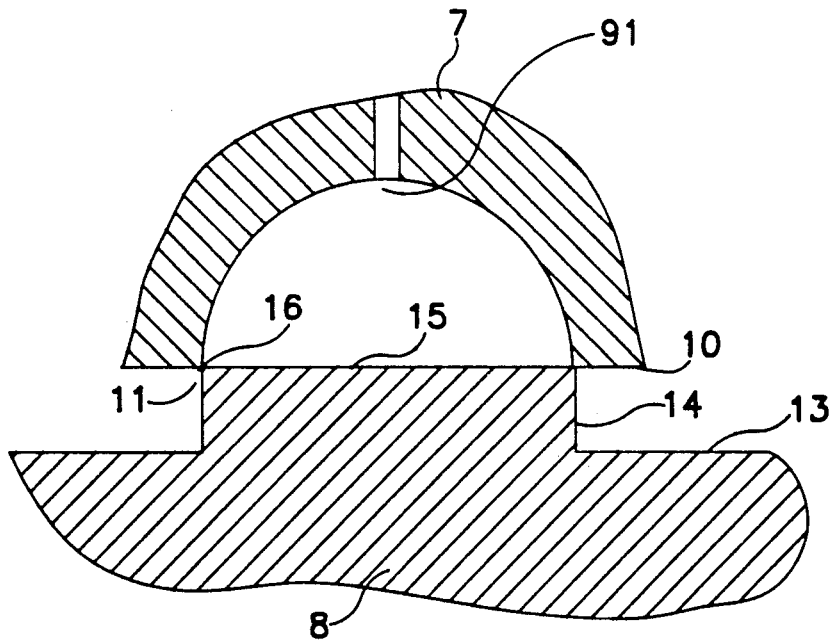
FIG. 5 is a variant of the detail shown in section in FIG. 3.

As illustrated in FIG. 3, the male impression element edge line 16 corresponds in its profile to the edge line 11 of the female impression element 9 which faces the male impression element 12, the male impression element preferably penetrating slightly into the female impression element. However, it is also possible to produce an apparatus in which the edge lines 11 and 16 are situated on two cylindrical surfaces of the same radius of which the axes are spaced apart by one diameter, as illustrated in FIG. 5.

The two cylinders 7 and 8 and impression elements are configured and positioned in relation to one another in such a way that a male impression element 12 is always opposite a female impression element 9, the edge line 16 of the male impression element 12 thus being in contact with the edge line 11 of the female impression element 9.

In order permanently to maintain this perfect opposite arrangement, the two cylinders 7 and 8 may be rotated by a single motor with two return gears, each return gear driving one of the two cylinders 7,8.

As illustrated in FIG. 3, the configurations and the positioning of a male impression element 12 and a female impression element 9 opposite one another delimit a cavity 17 In addition, since the male impression element 12 is raised and the female impression element 9 is recessed, the surface 10 of the cylinder 7 and the surface 13 and the side 14 of the cylinder 8 define a space 18 which is not in the same plane as the cavity 17 because the space 18 and the cavity 17 are situated on either side of the surface 10 of the cylinder 7.

A suitable device, of which the exact shape is dependent on the shape of the male and female impression elements, may be provided immediately downstream of the cylinders 7 and 8 to direct the scraps produced by cutting of the product 3 towards a removal circuit.

This device may be formed by a series of wedges tangential to the cylinder 7 bearing the female impression elements 9 and situated on either side of the female impression elements 9 along the axis of the cylinder 7 downstream of the contact zone between the male impression elements 12 and the female impression elements 9.

A device formed, for example, by two lateral guides may be provided upstream of the cutting unit 9 for perfectly positioning the product 3 in relation to the male impression elements 12 and the female impression elements 9.

In operation, an expanded coextruded product 3 is formed by the coextrusion cooking apparatus 1.

This product is transported by the conveyor belt 5 and is optionally flattened by the flattening unit.

Figure 4:
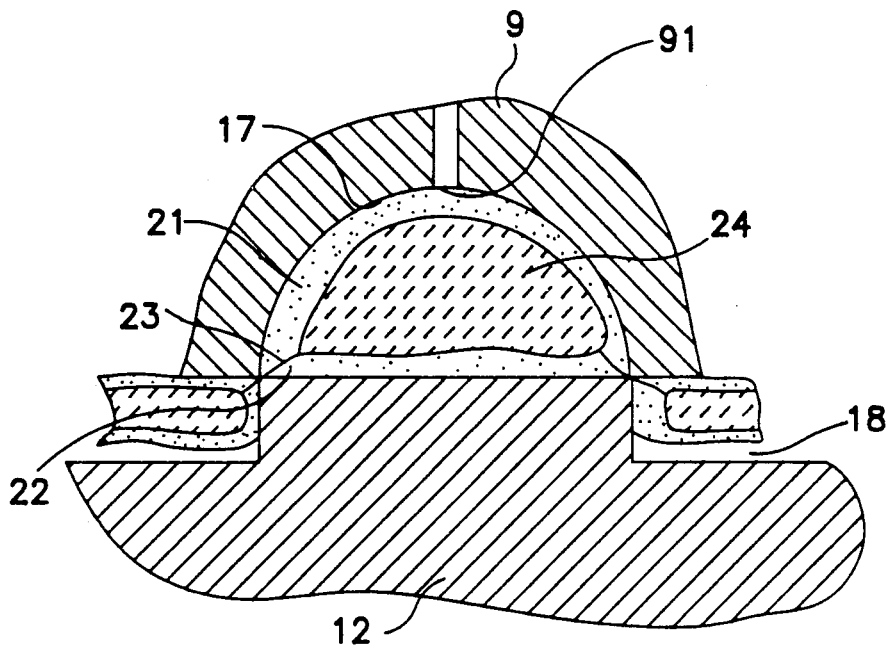
FIG. 4 is a section similar to FIG. 3 illustrating the cutting of a coextruded product.

The product 3, which is still thermoplastic, is then directed towards the cutting unit 2 after having been positioned by the lateral guides As illustrated in FIG. 4, the product 3 is stamped between a female impression element 9 and a male impression element 12.

Since the product 3 is in the cavity 17, the two edges 21 and 22 formed by stamping of the outer envelope of the product 3 are brought into contact and form a joining line 23. Since, moreover, the waste situated outside the cavity 17 in the space 18 is in a different plane from the cavity 17, a shearing force is generated where the edge lines 11 and 16 contact one another, promoting separation of the waste from the product situated in the cavity 17. A product having a continuous outer envelope surrounding an inner filling 24 is thus obtained.

The cylinders 7 and 8 continue to rotate, the male impression elements 12 and female impression elements 9 separate while the wedges definitively detach the scraps produced by the cutting operation.

The end product, still situated in the recessed female impression element 9, is then removed by the injection of compressed air through the orifice(s) 91. Removal of the end product by the injection of compressed air has the additional advantage that it fixes the shape of the end product because, under the cooling effect produced by the compressed air, the product is no longer thermoplastic at all when it is removed.

At the same time, another male impression element 12 engages in another female impression element 9 in the same way as described above.

Accordingly, the present invention enables a product obtained by coextrusion cooking to be cut into any shape while, at the same time, preserving its outer cereal-based envelope and the inner filling.

We claim:

1. A process for preparing a coextruded cooked food product comprising coextrusion-cooking a food product to obtain a product having an extruded outer thermoplastic envelope based on cereals and an inner edible filling, and while the outer envelope is still thermoplastic, stamping the product between two parallel counter-rotating cylindrical surfaces which define male and female impression elements configured and positioned so that upon rotation, the impression elements of one surface converge with the elements of the outer surface in a male to female relation to cooperate to cause shearing to cut the product into pieces.

2. A process according to claim 1 further comprising, after stamping, injecting compressed air into the female impression elements for removing cut pieces from the female impression elements.

3. A process according to claim 1 further comprising flattening the product prior to stamping.

4. A process according to claim 1 wherein the impression elements are configured so that the male elements penetrate into the female elements.

5. A process for preparing a coextruded cooked food product comprising counter-rotating two parallel cylindrical surfaces which define male and female impression elements which are configured and positioned so that upon rotation, the impression elements of one surface converge with the elements of the other surface in a male to female relation and stamping a coextruded cooked food product having a thermoplastic envelope between the impression elements to cut the product into pieces.

6. A process according to claim 5 further comprising, after stamping, injecting compressed air into the female impression element for removing cut pieces from the female impression elements.

7. A process according to claim 5 further comprising flattening the product prior to stamping.

8. A process according to claim 5 wherein the impression elements are configured so that the male elements penetrate into the female elements.

* * * * *

UNITED STATES PATENT AND TRADEMARK OFFICE
CERTIFICATE OF CORRECTION

PATENT NO. : 5,198,257
DATED : March 30, 1993
INVENTOR(S) : Ernst HECK, et al.

It is certified that error appears in the above-identified patent and that said Letters Patent is hereby corrected as shown below:

```
Column 2, line 15, "line" should be --lines--.

Column 2, line 54, after "the", delete --two--.

Column 5, line 28 (line 6 of claim 1), after "between"
insert --a--.
```

Signed and Sealed this

Thirtieth Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,198,257

DATED : March 30, 1993

INVENTOR(S) : Ernst HECK, et al.

It is certified that error appears in the above-identified patent and that said Letters Patent is hereby corrected as shown below:

Column 5, line 32 (line 10 of claim 1), "outer" should be --other--.

Signed and Sealed this

Eleventh Day of January, 1994

Attest:

BRUCE LEHMAN

*Attesting Officer*   *Commissioner of Patents and Trademarks*